United States Patent
Sen et al.

(10) Patent No.: US 6,701,149 B1
(45) Date of Patent: Mar. 2, 2004

(54) HANDOFF FRAMEWORK TO SUPPORT REAL-TIME DELAY-CRITICAL SERVICES IN A NEXT GENERATION NETWORK

(75) Inventors: Sanjoy Sen, Plano, TX (US); Tanuj Bagchi, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 235 days.

(21) Appl. No.: 09/616,310

(22) Filed: Jul. 17, 2000

Related U.S. Application Data

(60) Provisional application No. 60/144,449, filed on Jul. 19, 1999.

(51) Int. Cl.[7] .................................................. H04Q 7/20
(52) U.S. Cl. .................... 455/436; 455/450; 455/452.1; 455/452.2; 455/458; 455/437; 455/422.1; 370/230; 370/235; 370/228; 370/329; 370/331; 370/335; 370/336; 370/337; 370/338; 370/341; 370/342; 370/343; 370/344; 370/345; 370/346; 370/347; 370/348; 370/443; 370/444; 370/461; 370/462
(58) Field of Search .............................. 455/422.1, 450, 455/436, 452.1, 458, 437; 370/230, 235, 328, 329, 331, 335, 336–338, 341–345, 347–348, 443, 444, 461–462; 375/260, 148

(56) References Cited

U.S. PATENT DOCUMENTS

| | | | |
|---|---|---|---|
| 5,574,977 A | * 11/1996 | Joseph et al. | 455/450 |
| 6,252,862 B1 | * 6/2001 | Sauer et al. | 370/331 |
| 6,374,112 B1 | * 4/2002 | Widegren et al. | 370/352 |
| 6,438,370 B1 | * 8/2002 | Einola et al. | 455/422 |
| 6,449,481 B1 | * 9/2002 | Kwon et al. | 455/437 |
| 6,484,145 B1 | * 11/2002 | Home et al. | 705/8 |

* cited by examiner

Primary Examiner—Erika Gary
Assistant Examiner—David Nguyen
(74) Attorney, Agent, or Firm—Haynes and Boone, LLP

(57) ABSTRACT

A next generation wireless data network and method for handing off a mobile node is presented. The network includes a core network (CN) coupled to a plurality of radio access networks (RANs). The RAN servicing the mobile node examines overload factors in the wireless data network while the CN examines admission capabilities to neighboring RANs. The wireless data network determines a traffic situation of the neighboring RANs and admits a new user to one of the neighboring RANs based on results of the examinations and the determination.

13 Claims, 2 Drawing Sheets

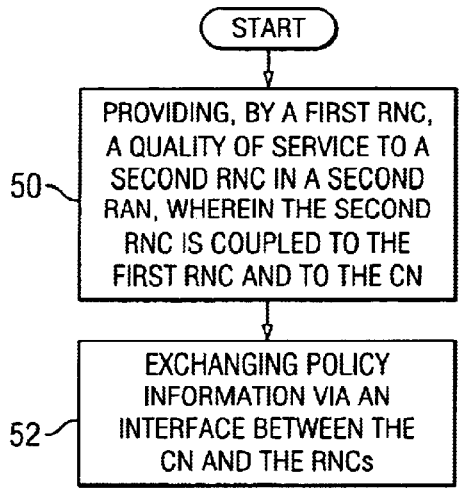
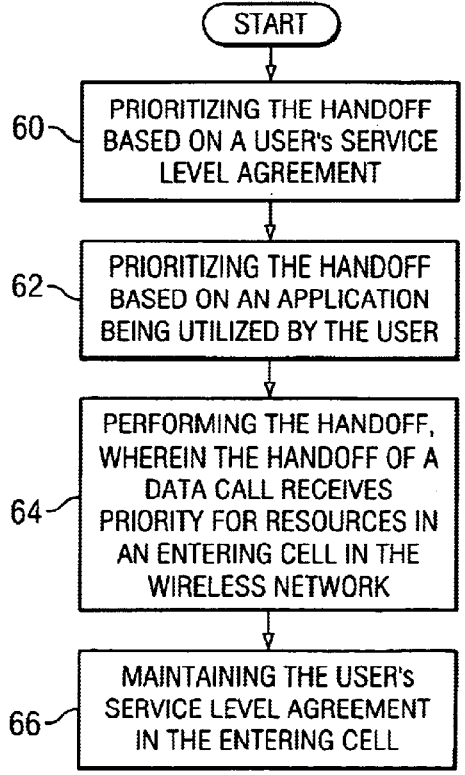
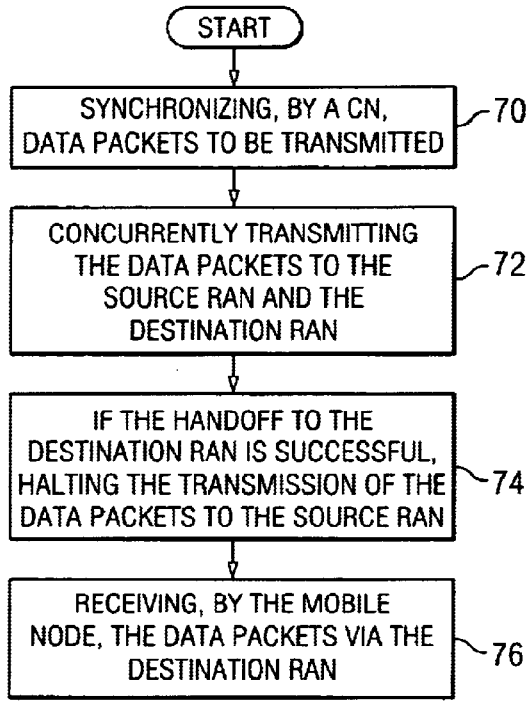
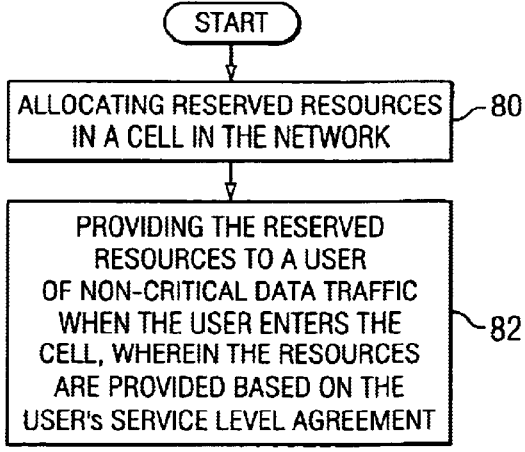
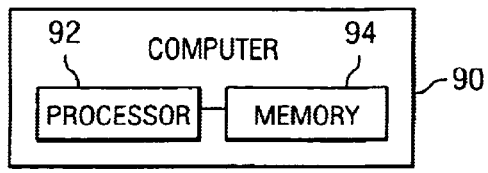

HANDOFF FRAMEWORK TO SUPPORT REAL-TIME DELAY-CRITICAL SERVICES IN A NEXT GENERATION NETWORK

Cross Reference

This application claims the benefit of the Provisional application assigned U.S. serial No. 60/144,449 filed on Jul. 19, 1999. Additionally, this application is related to U.S. patent application Ser. No. 09/617,219, filed on even date herewith, entitled HANDOFF MECHANISMS TO SUPPORT REAL-TIME DELAY-CRITICAL SERVICES IN A NEXT GENERATION NETWORK, assigned to the assignee of the present application, and hereby incorporated by reference herein. Further, this application is related to U.S. Patent Application Ser. No. 09/469,668, filed on Dec. 22, 1999, entitled GPRS MAC PROCEDURES TO SUPPORT REAL-TIME SERVICES, assigned to the assignee of the present application, and hereby incorporated by reference herein.

BACKGROUND

This application relates generally to a system and method for handing off a mobile node and more particularly to a handoff framework to support real-time delay critical services in a next generation wireless network.

In data networks, such as Internet Protocol (IP) networks, mobile users are typically assigned to a particular class of service (such as Platinum, Gold, or Silver) based on a service level agreement (SLA) with their service provider. In a fixed network, it is relatively easy to engineer and assign the user an appropriate amount of network resources so that the SLA can be maintained at all times. However, mobility and the air-interface being utilized make the problem more difficult because the network resources have to be reassigned and/or renegotiated as the user moves from one cell to another. Additionally, the inherent hostile nature of the air-interface makes it difficult to predict and react accordingly to the changes in the radio frequency (RF).

Historically, there have been two methods to support mobility across wireless cells. In the first method, a mobile node is in the full control of the decision making and the target selection process while moving from one cell to the other. In Global Systems for Mobile Communications (GSM) or North American Time Division Multiple Access (NA TDMA) terminology this method is known as reselection. In a reselection process, the mobile node and the network have a master-slave relationship where the mobile node decides which cell serves its interest best. The network does not really have control over the target cell selection and so it is alerted to the mobile node's decision only after the target cell is selected. As a result, reselection is typically more time consuming from a network resource allocation point of view. Also, reselection during an active session requires the network to temporarily buffer the data destined for the mobile node. Additionally, the target cell may not even have enough resources to address the resource needs of the mobile node.

In the second method, the network, along with input from the mobile node, decides when and where to handoff the mobile node. Handoff refers to the transfer of an ongoing wireless call from one transmission site (cell) to another without disconnecting the call. This method requires constant monitoring of the mobile node's signal strength as well as complex management of target selection and network resource assignment. Network directed handoff also requires more messaging over the air compared to reselection. However, this kind of mobility support can work faster because the target is known before the actual handoff takes place. Also, the resource allocation and appropriate reservation can be done at the target to meet the mobile node's demand. In a variation of this scheme in GSM and NA TDMA, the mobile node assists the network by periodically sending it RF related information regarding the mobile nodes' neighboring cells. This facilitates the decision making process at the network and is called Mobile Assisted Handoff (MAHO).

The reselection based mobility works fine when the mobile node is idle or in a non-real time active session. However, as previously mentioned, reselection may result in considerable delays. Thus, buffering data for a synchronous real time application (such as voice or video) during this delay interval is not recommended. As such, over the period of a few seconds of reselection related delay, several voice packets may be dropped resulting in audible speech clipping. The reselection mechanism does not have any control over the availability of the network resources at the target cell. Additionally, in the current General Packet Radio Service (GPRS) network model, the reselection process does not prioritize resources based on the user's SLA. To address Quality of Service (QoS) requirements for real-time, delay-sensitive multimedia services, the handoff mechanism needs to be optimized and enhanced in next generation wireless data (IP) networks.

Therefore, an improved system and method to support the handoff of a mobile node utilizing real-time delay-critical services in a next generation wireless data network is desired to reduce or eliminate the aforementioned complexities and limitations.

SUMMARY

In response to these and other complexities and limitations, provided herein is a unique system and method for handoff of a mobile node utilizing real-time delay-critical services in a next generation wireless data network.

In one embodiment, the system includes a core network (CN) coupled to a radio access networks (RAN) which serves a mobile node. The RAN examines overload factors in the system and the CN examines admission capabilities to neighboring RANs. A traffic situation of cells (or nodes) in the neighboring RANs is determined and a new user is admitted to one of the neighboring cells based on results of the examinations and the determination. The overload factors include a radio frequency resource availability value, the user's service profile, an existing application's traffic characteristics, and the user's priority. An admission control function is also provided to interact with entities in the RAN and in the CN.

In some embodiments, the system comprises a first Radio Network Controller (RNC) in the first RAN, where the first RNC provides a quality of service to a second RNC in a second RAN that is coupled to the first RNC and to the CN. Policy information is exchanged via an interface between the CN and the RNCs.

In other embodiments, the system comprises a means for prioritizing the handoff based on a user's service level agreement and on an application being utilized by the user; a means for performing the handoff, where the handoff of a data call receives priority for resources in an entering cell in the wireless network; and means for maintaining the user's service level agreement in the entering cell. A means for utilizing admission control to improve the management of the, for example, radio frequency resources is utilized. The admission control includes admitting a new user, admitting a new radio access channel, and admitting a new radio link.

In further embodiments, the system comprises a means for synchronizing, by the CN, data packets to be transmitted; a means for concurrently transmitting the data packets to a source RAN and a destination RAN that are coupled to each other and to the CN; a means for halting the transmission of the data packets to the source RAN if the handoff to the destination RAN is successful; and a means for receiving, by the mobile node, the data packets via the destination RAN.

In additional embodiments, the system comprises a means for allocating reserved resources in a cell in the network and a means for providing the reserved resources to a user of non-critical data traffic when the user enters the cell, where the resources are provided based on the user's service level agreement.

These advantages, as well as others, which will become apparent, are described in greater detail with respect to the drawings and the remaining disclosure.

BRIEF DESCRIPTION OF THE DRAWINGS

FIG. 3 is a flow chart of a method of the present invention for controlling handoff in the communication system that comprises a CN coupled to a first RNC in a first RAN.

FIG. 4 is a flow chart of a method of the present invention for handoff in the communication system.

FIG. 5 is a flow chart of a method of the present invention for handing off a mobile node in the communication system that includes a CN coupled to a source RAN and a destination RAN, where the destination RAN is also coupled to the source RAN.

FIG. 6 is a flow chart of a method of the present invention for soft reservation in the communication system.

FIG. 7 is a computer for implementing certain embodiments of the present is invention.

DETAILED DESCRIPTION

Figure 1:
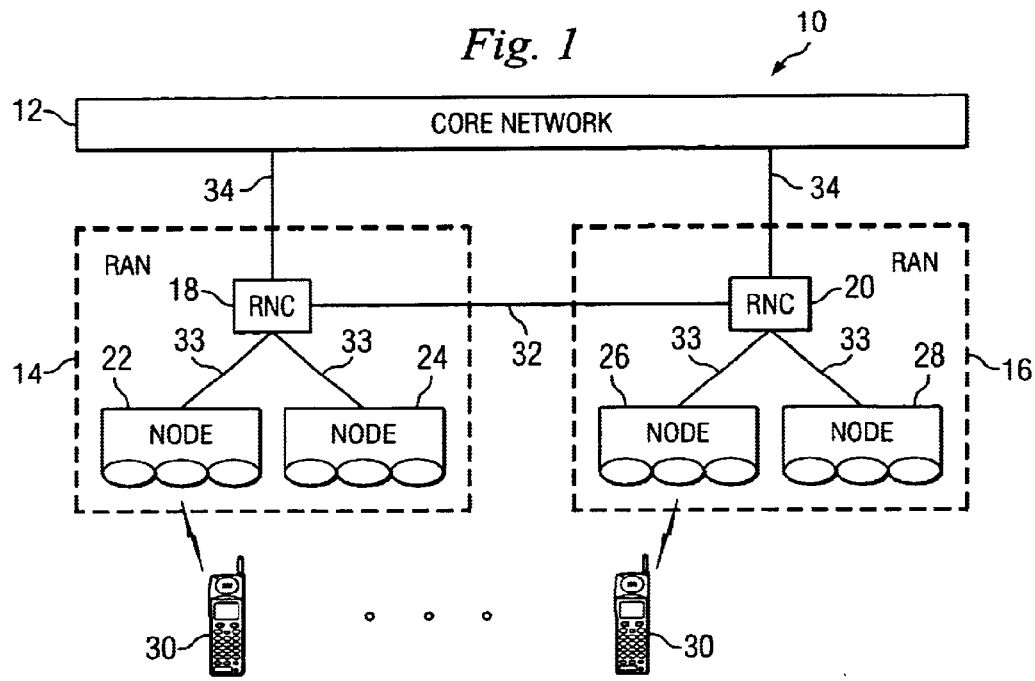
FIG. 1 is a diagrammatic view of a communication system of the present invention.

FIG. 1 depicts a communication system (network) 10 of the present application. The system 10 includes a Core Network (CN) 12 that is coupled to Radio Network Controllers (RNCs) 18–20 via interfaces 34. The CN 12 performs several functions including managing a user's profile and SLA while the RNCs 18–20 perform radio resource management and handoff control. The RNCs 18–20 are respectively coupled to nodes 22–24 and 26–28 and together form Radio Access Networks (RANs) 14–16. The nodes 22–28 transmit and receive information between the RNCs 18–20 and the mobile node 30. The RNCs 18–20 are also coupled to each other via interface 32 and may pass system related information between one another.

According to FIG. 1, the mobile node 30 is communicating with CN 12 via RAN 14. If the user of the mobile node 30 leaves the coverage area of RAN 14 and travels toward the coverage area of RAN 16, a handoff will occur that will allow the user to continue to communicate with CN 12 via RAN 16. During the handoff process, it is important to maintain the user's QoS. As such, according to the present disclosure, the following are identified as requirements during handoff in a next generation network (such as communication system 10, a 3G.IP network, a 3G.PP network, and a 4G network):

1. Minimizing the handoff delay for real-time, non-elastic applications (such as voice and video);
2. Initiating handoffs at the right time to effectively manage RF related issues;
3. Prioritizing handoffs based on the user's SLA and application being used; and
4. Maintaining the SLA across the handoff boundary.

Delay Minimization

Delay minimization is an important factor for real-time, non-elastic applications. As such, a network directed handoff will be used, but will only be applicable to certain time-critical data applications based on real time requirements and the particular SLA. For regular data sessions such as Internet browsing or file transferring, a reselection based handoff can be used. The reselection based handoff is advantageous because it may be the only way to recover from a fast fade situation (since the network directed handoff messages may not reach the mobile node in an extremely hostile RF environment). Network directed handoff can facilitate the following requirements in a next generation network: maintaining a certain QoS across the handoff boundary, preserving the user's service class, and facilitating admission control for better RF resource management.

Handoff delay minimization may also be achieved in either the reselection or the network directed handoff technique by using IP multicast routing protocols. These protocols can be used to forward packets simultaneously to the mobile's current location, serviced by RAN 14, as well as to the destination, serviced by RAN 16. However, the difficulty with traditional IP multicast protocols is that the path delay for packets traversing the two multicast branches may be different. For example, a packet may reach the destination RAN 16 much later than its duplicate in the source RAN 14 and hence would be considered invalid in a real-time packet data transmission setting. Hence, according to an embodiment of the present application, the data packet traffic streams destined for the source RAN 14 and the destination RAN 16 are synchronized when IP multicast protocols are used. Thus, the mobile node 30 is able to receive a valid packet after a hard handoff occurs. Utilizing synchronized data packet streams, various functions such as using multicasting to support mobility, performing advance registration and having packets delivered to a next cell in advance of a handoff are all possible.

Handoff Decision Making

To facilitate the decision making process during a handoff, a handoff decision function with improved measurement tolerance is used for network directed handoffs. Thus, a handoff controller (which is located in each of the RNCs 18–20) is tasked with handoff decision making and target selection based on received Relative Signal Strength Indicator/Bit Error Rate (RSSI/BER) measurement reports. The resource availability based on the user's SLA is analyzed during the target selection process. This information is communicated between the cell sites over interfaces 33 as well as interface 32.

Prioritization and Traffic Classification

Prioritization and traffic classification are important considerations for maintaining the QoS and SLA across a handoff boundary. It is an embodiment of the present disclosure to prioritize different applications based on the user's SLA. For example, a handoff request for a time critical application of a platinum level user will receive a higher priority compared to the same request of a bronze level user. Additionally, among the same service class, handoff calls will receive a higher priority than non-handoff calls. If a target cell cannot support the current QoS, an end-to-end re-negotiation of the QoS parameters is performed because the destination cell (in the destination RAN 16) may not be able to provide the QoS requirement of the session (or data call) that is being handed off. In absence of an end-to-end QoS re-negotiation, the call may drop. As such, the interfaces 34 are enhanced by adding QoS parameters and end-to-end QoS negotiation and establishment messages to allow for interaction between the RANs 14–16 and the CN 12 in order to perform these aforementioned tasks.

Admission Control/Resource Reservation

The purpose of admission control is to admit or deny new users, new radio access bearers or new radio links (for example during handoff). The admission control mechanism should avoid overload conditions and base admission decisions on several factors such as RF resource availability, existing user's service profile, existing application's traffic characteristics, and the priority. As a result, the admission control function interacts with entities in the RANs 14–16 as well as in the CN 12.

In some embodiments, it is desired that admission control decisions to be taken based on the traffic situation in a neighborhood of cells. As such, a concentration of highly mobile premium service users in a cell will trigger resource reservations in the neighboring cells in anticipation of a handoff. Additionally, for optimum RF utilization, the reserved resources may be disbursed among a non-time critical but premium user class. This "soft reservation" allows for the allocation of the "reserved" resources (for predicted handoff users from neighboring cells) to non-time-critical type traffic in the current cell, so that they can be preempted and re-allocated to those handoff users when they enter the cell. This soft reservation functionality will primarily be applicable to premium users in order to reserve an appropriate amount of the scarce radio resource. This management of traffic admission requires close interaction between the RANs in the mobile node's 30 neighboring cells (such as RAN 16) and the CN 12.

A handoff control function of the present disclosure interacts with two admission control entities in the system 10. These entities are Radio Resource Managers in the RNCs 18–20 and a Policy Manager in the CN 12. The Radio Resource Manager in RNC 18 and the Radio Resource Manager in RNC 20 exchange messages, via the interface 32, that include QoS/policy related information. The Policy Manager, which acts as a bandwidth broker, exchanges policy information messages (via the interfaces 34) with the RNCs 18–20.

Figure 2:
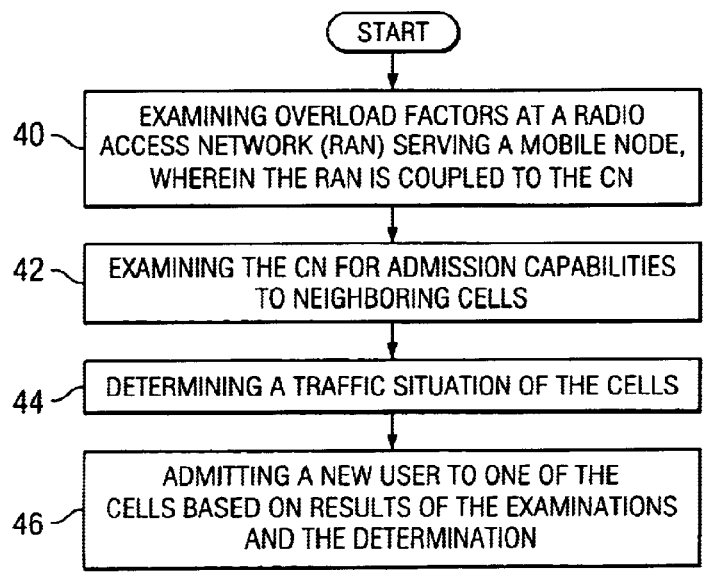
FIG. 2 is a flow chart of a method of the present invention for handing off a mobile node in the communication system.

FIG. 2 depicts a method for handing off the mobile node 30 in the wireless network 10. The method begins at step 40 where overload factors are examined at the RAN 14 serving the mobile node 30. The overload factors may include a radio frequency resource availability value, the user's service profile, an existing application's traffic characteristics, and the user's priority. The method proceeds to step 42 where the CN 12 is examined for admission capabilities to neighboring cells. During step 44, a traffic situation of the cells is determined and during step 46, a new user (i.e. another mobile node) is admitted to one of the neighboring cells based on results of the examinations and the determination.

FIG. 3 depicts a method for controlling handoff in a wireless network that comprises a CN coupled to a first RNC in a first RAN. The method begins at step 50 where the first RNC provides a quality of service to a second RNC in a second RAN. The second RNC is coupled to the first RNC and to the CN. The method proceeds to step 52 where policy information is exchanged via an interface between the CN and the RNCs.

FIG. 4 depicts a method for handoff in a wireless network. The method begins at step 60 where the handoff is prioritized based on a user's service level agreement. At step 62, the handoff is prioritized based on an application being utilized by the user. The method proceeds to step 64 where the handoff is performed and where the handoff of a data call receives priority for resources (such as radio frequency resources) in an entering cell in the wireless network, utilizing admission control to improve management of the resources. The admission control may include admitting a new user, admitting a new radio access channel, and admitting a new radio link. At step 66, the user's service level agreement is maintained in the entering cell.

FIG. 5 depicts a method for handing off a mobile node in a wireless network that includes a CN coupled to a source RAN and a destination RAN, where the destination RAN is also coupled to the source RAN. The method begins at step 70 where the CN synchronizes data packets to be transmitted. At step 72, the data packets are concurrently transmitted to the source RAN and the destination RAN. If the handoff to the destination RAN is successful, the transmission of the data packets to the source RAN is halted at step 74. The method proceeds to step 76 where the mobile node receives the data packets via the destination RAN.

FIG. 6 depicts a method for soft reservation in a wireless network. The method begins at step 80 where reserved resources are allocated in a cell in the network. The method proceeds to step 82 where the reserved resources are provided to a user of non-critical data traffic when the user enters the cell. These reserved resources are provided based on the user's service level agreement.

FIG. 7 depicts a computer 90 that comprises a processor 92 and memory 94. The computer 90, which contains a computer program, may be a personal computer or laptop, the CN 12, the RANs 14–16, the RNCs 18–20, the nodes 22–28, the mobile node 30, and/or any device that can transmit and receive handoff related information. The processor 92 may be a central processing unit, digital signal processor, microprocessor, microcontroller, microcomputer, and/or any device that manipulates digital information based on programming instructions. The memory 94 may be read-only memory, random access memory, flash memory and/or any device that stores digital information. The memory 94 is coupled to the processor 92 and stores programming instructions (contained in the computer program) that, when read by the processor 92, cause the processor to perform the steps discussed above with reference to FIGS. 2–6.

The present invention thus enjoys several advantages. For example, the mechanism of handoff, in next generation wireless data networks, is optimized and enhanced to effectively and efficiently address the QoS requirements for real-time, delay-sensitive multimedia services. Additionally, the handoff delay for these services is minimized and handoffs are initiated to effectively manage RF related issues. Further, handoffs are prioritized based on the user's SLA (which is maintained across the handoff boundary) and application being used.

It is further understood that other modifications, changes and substitutions are intended in the foregoing disclosure and in some instances some features of the disclosure will be employed without corresponding use of other features. Additionally, singular discussion of items and/or computers located in the system 10 is also meant to apply to situations where multiple items and/or computers exist. Further, the system 10 may include additional and/or fewer items and/or computers that perform similar functions discussed in the disclosure. Accordingly, it is appropriate that the appended claims be construed broadly and in a manner consistent with the scope of the disclosure.

What is claimed is:

1. A method for handing off one of a plurality of mobile nodes in a wireless network having a core network (CN), the method comprising:

examining overload factors at a first radio access network (RAN) serving the plurality of mobile nodes, wherein the first RAN is coupled to the CN;

examining the CN for admission capabilities to neighboring cells;

determining a traffic situation of the neighboring cells, wherein the determination includes analyzing an availability of at least one resource based on a service level associated with the mobile node;

monitoring a cell containing a plurality of mobile nodes of a specified service level, wherein a resource reservation is triggered in the neighboring cells in anticipation of a handoff when a predetermined threshold is met;

reserving at least a portion of the resource to ensure a level of availability based on the service level prior to knowing which neighboring cell will receive the handoff; and admitting a mobile node to one of the neighboring cells based on results of the examinations and the determination, wherein admitting the mobile node includes allocating the portion of the resource to the mobile node.

2. The method of claim 1 wherein the overload factors include a radio frequency resource availability.

3. The method of claim 1 wherein the overload factors include the user's service profile.

4. The method of claim 1 wherein the overload factors include an existing application's traffic characteristics.

5. The method of claim 1 wherein the overload factors include the user's priority.

6. The method of claim 1 further comprising providing an admission control function to interact with entities in the first RAN.

7. The method of claim 1 further comprising providing an admission control function to interact with entities in the CN.

8. The method of claim 1 further comprising synchronizing data sent to the first RAN and a second RAN when using multicast protocols.

9. A system for handing off one of a plurality of mobile nodes in a wireless network having a core network (CN) and a plurality of radio access networks (RANs), the system comprising:

a RAN for examining overload factors in the system, wherein the RAN is coupled to the CN;

the CN for examining admission capabilities to neighboring RANs;

means for determining a traffic situation of the neighboring RANs;

means for monitoring the RAN for a predetermined threshold of mobile nodes of a specified service level, wherein a resource reservation is triggered in the neighboring RANs in anticipation of a handoff when the predetermined threshold is met, wherein the reservation occurs prior to knowing which neighboring RAN will receive the handoff; and means for admitting a mobile node to one of the neighboring RANs based on results of the examinations and the determination, wherein the means for admitting the mobile node includes:

means for allocating reserved resources in a cell in the network; and means for providing the reserved resources to the mobile node when the mobile node enters the cell, wherein the resources are provided based on at least one of a service level agreement of the mobile node and an application being utilized by the mobile node.

10. The system of claim 9 wherein the overload factors comprise at least one element selected from the group consisting of:

a radio frequency resource availability;

the user's service profile;

an existing application's traffic characteristics; and the user's priority.

11. The system of claim 10 further comprises providing an admission control function to interact with entities in the RAN.

12. The system of claim 10 further comprises providing an admission control function to interact with entities in the CN.

13. A computer program comprising instructions for:

examining overload factors at a radio access network (RAN) serving a mobile node, wherein the RAN is coupled to a core network (CN);

examining the CN for admission capabilities to neighboring RANs;

determining a traffic situation of the neighboring RANs;

monitoring a first cell containing the mobile node for a predetermined threshold of mobile nodes of a specified service level, wherein a resource reservation is triggered in the neighboring RANs in anticipation of a handoff when the predetermined threshold is met, and wherein the reservation occurs prior to knowing which neighboring RAN will receive the handoff; and admitting the mobile node to one of the neighboring RANs based on results of the examinations and the determination, wherein admitting the mobile node includes:

allocating reserved resources in a second cell in the network; and providing the reserved resources to the mobile node when the mobile node enters the second cell, wherein the resources are provided based on a service level agreement of the mobile node.

* * * * *